United States Patent [19]
Bahniuk

[11] Patent Number: 4,757,682
[45] Date of Patent: Jul. 19, 1988

[54] AXIAL FLOW TURBINE

[76] Inventor: Eugene Bahniuk, Cairn La., Gates Mills, Ohio 44040

[21] Appl. No.: 10,471

[22] Filed: Feb. 3, 1987

Related U.S. Application Data

[63] Continuation of Ser. No. 736,128, May 20, 1985, abandoned.

[51] Int. Cl.⁴ .............................................. F02C 3/045
[52] U.S. Cl. ....................................... 60/39.43; 60/726
[58] Field of Search ............ 60/39.43, 39.162, 39.163, 60/39.2, 39.45, 726; 415/53 T, 198.2, 213 T

[56] References Cited

U.S. PATENT DOCUMENTS

| | | | |
|---|---|---|---|
| 2,419,689 | 4/1947 | McClintock | 60/39.43 |
| 2,611,241 | 9/1952 | Schultz | 60/39.43 |
| 2,694,291 | 11/1954 | Rosengart | 60/39.43 |
| 3,269,120 | 8/1966 | Sabatiuk | 60/39.43 |
| 3,477,636 | 11/1969 | Gessner | 415/198.2 |
| 3,685,287 | 8/1972 | Nooley | 415/213 T |
| 3,756,019 | 9/1973 | Holzapfel et al. | 60/39.43 |
| 4,192,137 | 3/1980 | Chappell et al. | 60/39.162 |
| 4,325,672 | 4/1982 | Sixsmith | 415/198.2 |

Primary Examiner—Louis J. Casaregola
Attorney, Agent, or Firm—D. Peter Hochberg; Mark M. Kusner; Walter C. Danison, Jr.

[57] ABSTRACT

An axial flow turbine having one or more turbine wheels functioning both as the compressor and the turbine sections. Fluid flow is redirected over the compressor section to effect multiple stages of compression.

10 Claims, 4 Drawing Sheets

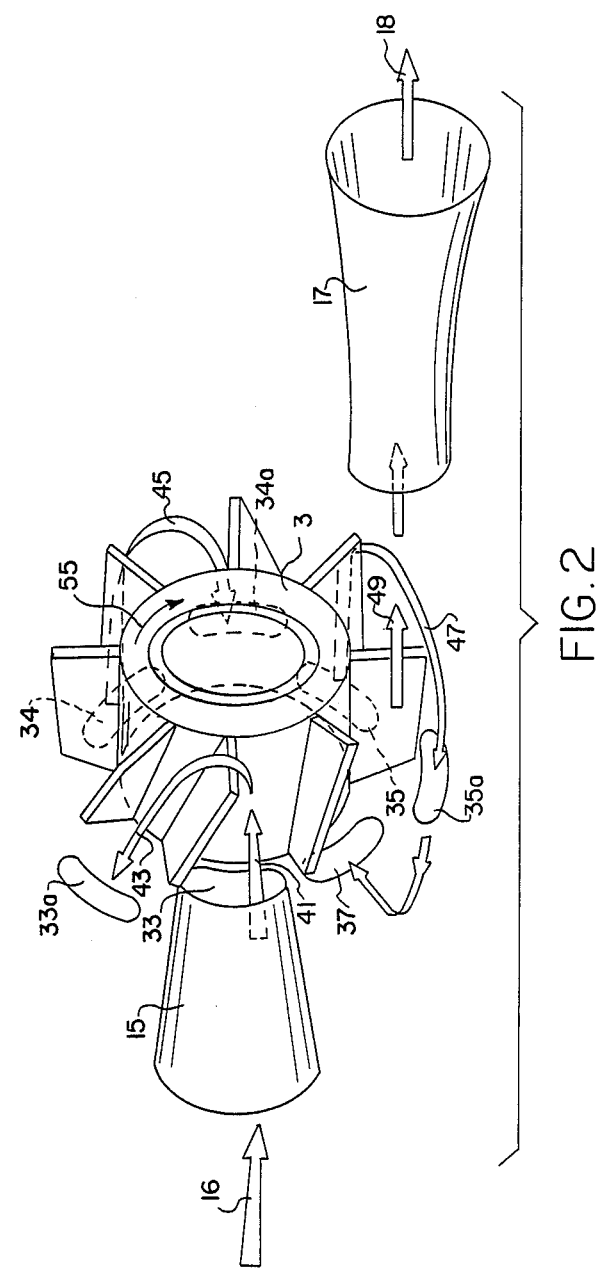

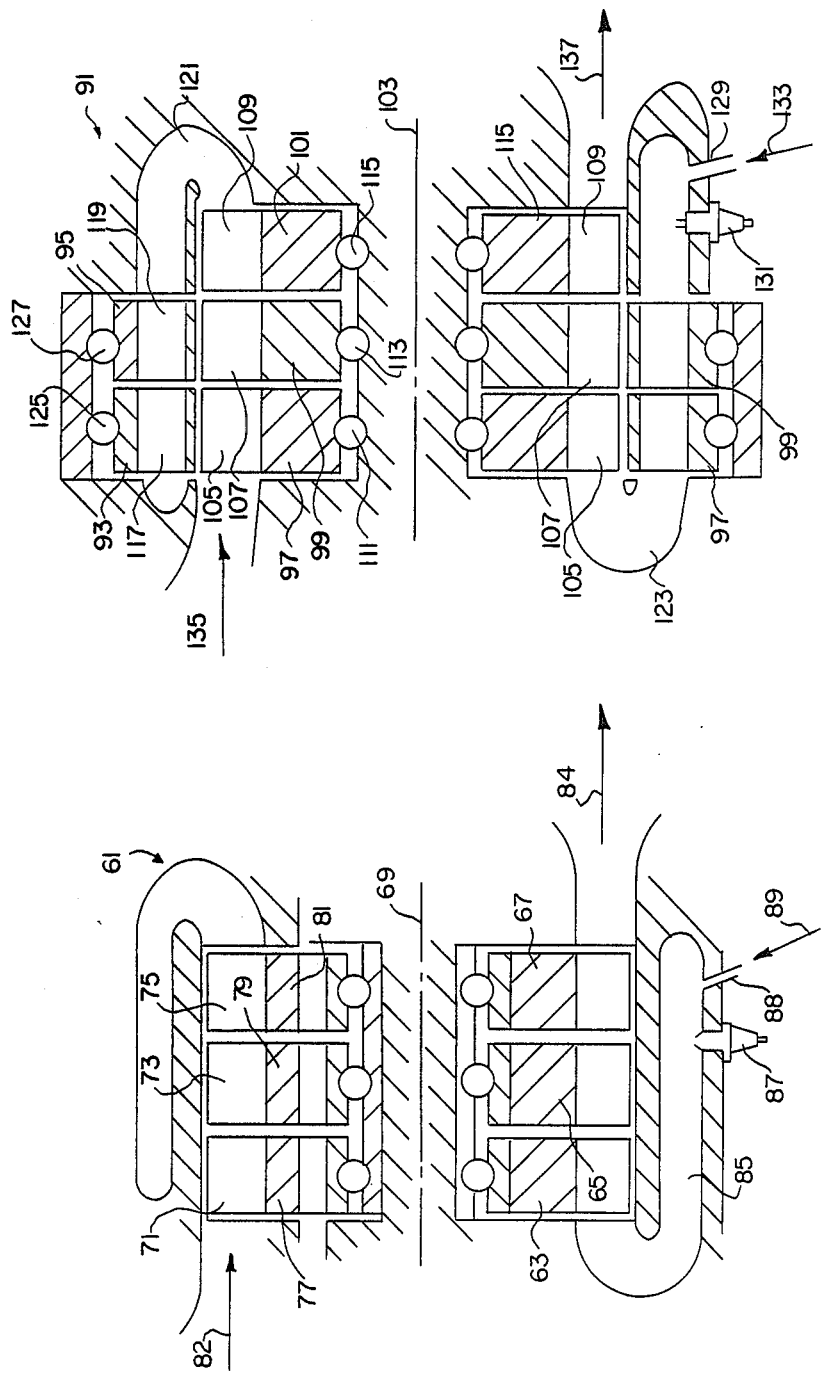

AXIAL FLOW TURBINE

This is a continuation of copending application Ser. No. 736,128 filed on 5/20/1985 now abandoned.

BACKGROUND OF THE INVENTION

This invention relates to axial flow turbines, and in particular to axial flow turbines wherein the turbine also functions as a compressor.

Axial flow turbines are used to generate power for a variety of uses. These turbines commonly are composed of a compressor section which increases the pressure of the ambient air which enters the turbine, an ignition or flame area where fuel is injected into the compressed air, ignited and burned to add energy, and a turbine section where the expanding gas acts to generate mechanical power. The mechanical power is used to drive the compressor section and supply mechanical power for other purposes.

The common cycle used by the axial flow turbine is to compress ambient air, to heat the air by some means, and to use the expansion of this compressed air as a means for extracting mechanical energy. Commonly, the flow of the compressed air and heated gasses are in an essentially straight line path along the longitudinal length of the engine. It is well known that the efficiency of such engines is increased by increasing the pressure to which the air has been compressed and by heating the air to the greatest allowable temperature and passing this high temperature air through the turbines. The greatest temperature which can be used in such engines is determined by the material properties of the turbine portion of the engine. Since common engineering materials lose their mechanical properties when certain temperatures are exceeded, it is now necessary to limit the turbine temperatures to those determined by the properties of the turbine materials rather than to the temperatures desired for maximum efficiency. In modern turbine engines the temperature is generally limited by the introduction of excess air into the combustion system so as to reduce the temperatures of the gasses resulting from the combustion process. This results in less than maximum thermo-dynamic efficiency and in increased physical size of the turbine and high cost due to the use of exotic materials in the turbine section.

Other designers have proposed the use of a rotor that is common to both the compressor and turbine stages of the engine. Those designs allow cooling of the turbine blades during the compression stage so that the average temperature of the blades is reduced and thus allow for higher combustion temperatures. In those designs a single compression stage is used so that during approximately one-half of its revolution the rotor is exposed to the cooling air and during the remaining part of the revolution the rotor is exposed to the hot gasses.

SUMMARY OF THE INVENTION

It is an object of the present invention to provide an improved axial flow turbine.

Another object is to provide an axial flow turbine having a greater degree of cooling in the compression stage of the apparatus than has heretofore been available in such turbines.

A further object is to provide an axial flow turbine capable of operating at higher temperatures in the turbine stage of the apparatus for enhanced engine efficiency.

Another object is the provision of an axial flow turbine wherein stators can be reduced in number over prior turbines, or even eliminated.

Yet a further object of the invention is to provide an axial flow engine having one or more common rotors for the compression stage and the turbine stage.

Still another object of the invention is the provision of an improved axial flow engine having increased efficiency, reduced size and reduced cost over prior engines.

Other objects will be apparent from the description to follow and from the appended claims.

The preceding objects are achieved according to the preferred embodiments of the invention by the provision of a turbine wheel and/or turbine wheels which act both as compressor sections and as the turbine sections in an axial flow engine. The flow in the compressor section is redirected over the compressor section so that multiple stages of compression are accomplished by a single combined turbine-compressor rotor. The construction is such that a relatively long period of cooling is enabled as compared to the short period of exposure of the hot gases; thus, the average temperature of the blades is kept relatively low as compared to the flame temperature, allowing for higher flame temperatures to be used. Another feature of preferred embodiments is a means for eliminating the commonly used stator blades that are used in axial flow turbines. This is accomplished by a series of turbine wheels placed longitudinally so that multiple stages of compression and then expansion are attained as the gas passes in the longitudinal direction of the engine. A third aspect of preferred forms of the invention is the use of single rotors for compressors and turbines in the return path of the gas so as to further increase the number of stages of compression in the engine without increasing the longitudinal dimension. A further feature of preferred forms of the invention are mechanical means for extracting mechanical power from the engine for synchronizing individual blades, and the use of stator rotors where appropriate.

BRIEF DESCRIPTION OF THE DRAWINGS

FIG. 2 is a pictorial representation of the engine illustrated in FIG. 1, showing the inlet section, multiple stages of compression, the turbine portion of the engine, and the exhaust section of the engine.

FIG. 3 is a partial cross section taken along the longitudinal axis of an engine according to another embodiment of the invention, showing a multiplicity of rotors and turbines and also the combustion section of the engine.

FIG. 4 is a partial cross sectional view taken along the longitudinal axis of an engine with five rotors according to another embodiment of the invention.

DESCRIPTION OF THE PREFERRED EMBODIMENTS

Figure 1:
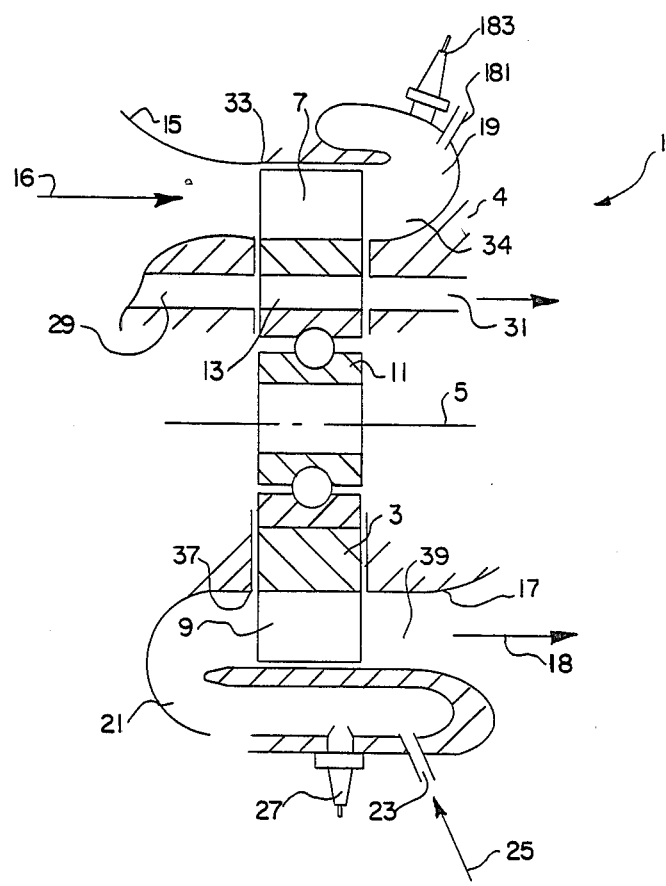
FIG. 1 is a schematic drawing of a cross section of an axial flow turbine and a portion of an axial flow compressor of an engine according to the invention.

With reference to the drawings, FIG. 1 shows an engine 1 having a single rotor 3 mounted for rotation in an engine body 4 about a stationary shaft with a longitudinal axis 5. The rotor is disc-like in shape and has vanes or blades 7 and 9 located around the circumference of the disc. Rotor 3 is attached to a bearing assembly 11 of known construction. Also disposed between vanes 7 and 9 and bearing 11 are a series of passageways 13. The inner race of bearing 11 is mounted to the engine mainframe which is not shown. An inlet passageway 15 is provided in body 4 through which inlet air is conducted as indicated by arrow 16. Air exits from engine 1 through a passage 7 in the direction of arrow 18. An exit passage from the rotor vanes is located at 19. A combustion chamber 21 has a fuel injector 23 through which fuel is injected as shown by arrow 25, and an igniter 27. Rotor passageways 13 are interconnected with passageways 29 and 31 in the main engine body 4.

Referring now to FIG. 2, inlet and exit passageways 15 and 17 are shown pictorially. Disposed radially about axis 5 of rotor 3 are spaced ports 33, 34, 35 and 37 which are in line with the blades for rotor 3. Ports 33, 34 and 35 direct incoming air through the blades of the rotor 3 for compression. Port 37 directs hot combustion gases through the blades of rotor 3 to drive same. Associated with compression ports 33, 34 and 35 are ports 33a, 34a and 35a. Ports 33a, 34a and 35a are located beyond, or outside, the radial extent of the blades of rotor 3. Ports 33a, 34a and 35a represent ports in the rotor housing which return compressed air to the inlet side of the rotor.

Fluid entering the engine is directed along a predetermined path which repeatedly guides the air through rotor 3. Arrows 41, 43, 45, 47 and 49 indicate the fluid flow direction. More specifically, arrow 41 indicated air flowing from port 33 through the blades of rotor 3. The air is then directed along a path above or outside of the blades (by means not shown) through ports 34a back to the inlet side of the rotor. This is illustrated by arrow 43. The air is then directed from port 34 through rotor 3 as illustrated by arrow 45. This compressed air is again directed over or above the blades of the rotor through port 34a to the inlet side of the rotor. In like fashion a third compression step is effected as illustrated by arrow 47 by directing the air from port 35, through the rotor, and back to the inlet side through port 35a. Following the 3 steps of compression, the air is ignited with fuel. The hot, combusted material is directed through rotor 3 from port 37 to drive the rotor as illustrated by arrow 49.

Referring next to FIG. 3, an engine 61 with 3 rotors 63, 65 and 67 is shown. Each rotor 63, 65 and 67 has a disc-like configuration, and is mounted for rotation about common axis 69. Each rotor 63, 65 and 67 has blades 71, 73 and 75, respectively, extending radially from hubs 77, 79 and 81. Air enters engine 61 in the direction of arrow 82, proceeds through the blades in the direction of arrow 83, and exits as indicated by arrow 84. A combustion chamber 85 having an ignition device 87 and a fuel injector 88 similar to the corresponding parts of engine 1 (FIGS. 1 and 2) is also provided. Fuel is injected in the direction of arrow 89 for ignition in chamber 83 by igniter 87.

The embodiment shown in FIG. 4 is an engine 91 having 5 rotors 93, 95, 97, 99 and 101. All 5 rotors are disc-like and have a common rotational axis 103. The inner rotors 97, 99 and 101 have vanes 105, 107 and 109, respectively, disposed about their periphery and bearings 111, 113 and 115, respectively, in their centers. Rotors 93 and 95 have vanes 117 and 119 disposed about their inner circumferences. Passageways 121 and 123 are shown connecting the vanes associated with the inner and outer rotors. Rotors 93 and 95 include bearings 125 and 127 which locate these rotors with respect to the engine main frame. A fuel injector 129 and an igniter 131 are also included as discussed earlier, with fuel entering the engine as indicated by an arrow 133. Incoming air follows the direction of an arrow 135 and outgoing air follows the path shown by an arrow 137.

Figure 5:
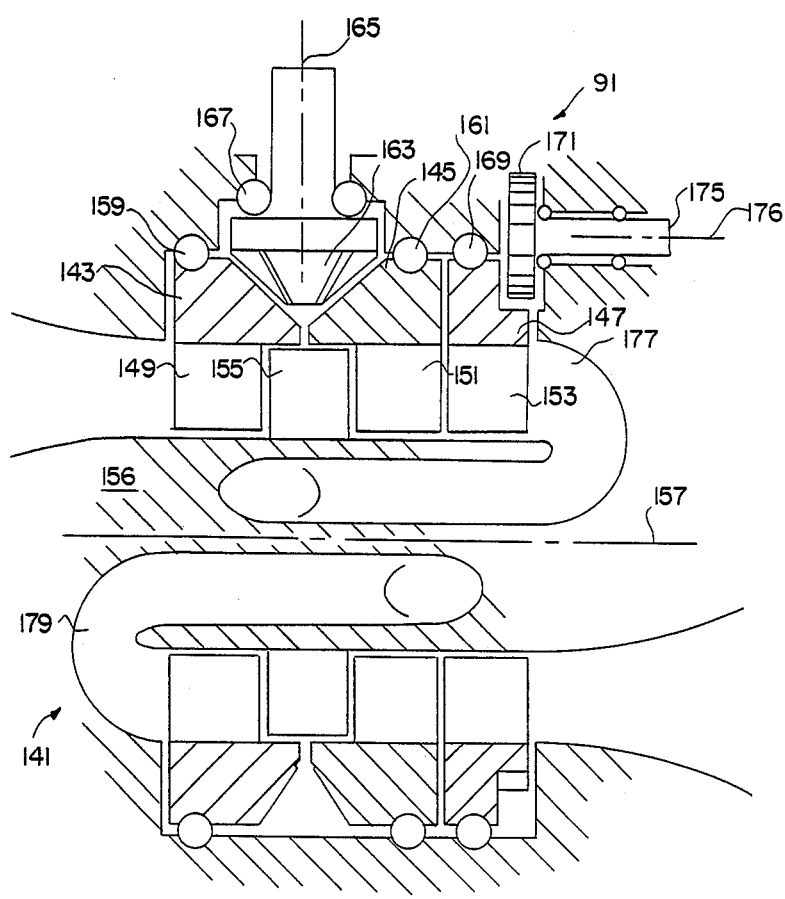
FIG. 5 is a longitudinal section of an engine according to a further embodiment of the invention, with three rotors, a stator section, means for removing mechanical power and/or starting, and a means for synchronizing the blade rotational speeds.

FIG. 5 shows an engine 141 according to another embodiment having three rotors 143, 145 and 147. The rotors have vanes 149, 151 and 153, respectively, disposed about their inner circumferences and extending radially therefrom. A series of stator vanes 155 are circumferentially disposed and extending radially from a cylindrical part 156 of the body of engine 141 which is coaxial with the axis of rotation 157 of the engine, and adjacent to rotors 143 and 145. Rotors 143 and 145 are constrained to rotate about axis 157 by bearings 159 and 161. A bevel gear 163 interacts with rotors 143 and 145. The bevel gear has a shaft 165 and is constrained by bearing 167. Rotor 147 is constrained by a bearing 169 and reacts with a spur gear 171 through which mechanical power can be extracted or introduced. Spur gear 171 is constrained by a pair of bearings 173 and has an output shaft 175 which rotates about an axis 176. A set of internal passageways 177 and 179 connect rotor outlet ports to rotor inlet ports, with passage 179 being a combustion chamber internal to rotors 149, 151 and 153.

The operation of the embodiment shown in FIGS. 1 and 2 will now be described. Ambient air enters through inlet passage 15 which is preferably a flow nozzle in the direction of the arrow 16. This air is compressed by the restricting passage of nozzle 15 and enters the compression section through port 33 which can use flow directing vanes as is common in the art. The flow passes through vanes 7 of rotating rotor 3. The flow exits the rotor through port 34 and is directed through passageway 19 over blades 7 and 9 to enter another port 35 shown on FIG. 2. As shown in FIG. 2, the flow is directed through the vanes in the direction of arrow 43, exits through a port not shown, is redirected over the blades in the direction of arrows 45 by the passage through which it flows, reenters for additional compression through a port not shown, then flows through vanes 7 and 9 and again is further compressed; the flow exits from passage 31 and is redirected as shown by arrows 47 and 49 through port 37. In this final stage of flow through passage 21 in FIG. 1, fuel is injected through port 23, is ignited by an ignition device 27, burns in passageway 21 and enters the turbine through port 37, flows in the direction shown by arrow 51 in FIG. 2, exits through port 39, and exhausts through port 17 in the direction of arrows 18 and 53. During the passage through the turbine after the combustion, the expanding fluid reacts on vanes 9 and imparts mechanical energy to the rotor 3. This mechanical energy produces a rotation of the rotor in the direction 55. This rotation of the rotor causes the vanes to act on the fluid so as to increase the fluid pressure during each passage of air through the compression section of the turbine as illustrated in FIG. 2. As illustrated, there are three passages through the rotor and, therefore, 3 compression cycles. Expansion only occurs at the last cycle during passage through the turbine stage. As illustrated in FIG. 2, the rotor is exposed to cool air for ¾ of the rotation and to the hot combustion air during approximately ¼ of the rotation.

A means for protecting bearing 11 from the heat of the turbine section is illustrated in FIG. 1. Circumferentially spaced around axis of rotation 5 of the rotor are passages which act as vanes to induce flow through the rotor. The air flow enters through passageway 29 is induced to flow through vanes 13, and exhausts through passageway 31.

The number of compression stages for each rotor can be varied so as to obtain the right ratio between mechanical power added to the rotor and that extracted during the compression stages. One or more compression stages can be used. The area ratio of the inlet ports can be varied as needed to increase efficiency or to obtain the desired cooling. Another consideration for the number of passages through the compressor is the amount of cooling desired during the compression stage. A further consideration in the design of the passages through the compression stages is the need to accomodate the increased pressure of the ambient air and therefore, the reduced volume of the compressed air. The successive inlet and outlet ports 33, 34, 37, 39 and 35 can be configured into sizes appropriate for the amount of compression and/or expansion of the fluid that occurs as it passes through the engine.

The engine shown in FIG. 3 has 3 rotating rotors 63, 65 and 67, each having multiple compression stages and turbine stages. The air enters as previously shown, enters vanes 71 of rotor 63, exits the vanes of rotor 63 and enters vanes 73 of rotor 65; the air is reacted upon by vanes 73, where an additional stage of compression occurs. Upon exiting vanes 73 the air enters vanes 75 of rotor 67 wherein additional compression occurs. The number of rotors and vanes so axially disposed can vary from 1 to whatever number is appropriate or desired for obtaining the desired compression prior to combustion. Upon exiting vanes 75, the fluid is redirected back to again reenter rotor 63 so that additional compression stages occur circumferentially around the rotor. At the final stage, the fluid enters combustion stage 85 where fuel is injected and burned or the fluid is heated by other means. The fluid then passes again through rotor 63, 65 and 67 in such a manner as to impart mechanical energy upon these rotors. The rotors rotate about axis 69. Rotors 63, 65 and 67 rotate in the directions determined by the design of blades 71, 73 and 75 of the respective rotors. It should be noted that adjacent rotors can rotate in the same direction or in opposite directions and at the same or different speeds as adjacent rotors. By appropriate design of the vanes, the direction and speeds of the individual rotors are determined. Stators for redirecting the flow may be incorporated between the individual rotors and in the exits and entrances to the rotors in a manner appropriate to increase efficiency.

In many applications where weight and size is of importance, the engine can be reduced in size by adding vanes in such a manner that the fluid in the return path can also be compressed or act on the turbine. The embodiment shown in FIG. 4 includes such features. The air flow in engine 91 passes through a compression stage produced by in effect rotating components 71, 73 and 75 shown in FIG. 3 which are equivalent to rotors 97, 99 and 101 in FIG. 4.

Upon exiting these rotors, the compressed air is directed through passage 121 and then passes through additional rotors 93 and 95. Upon passing rotors 93 and 95 the fluid is directed to reenter rotors 71, 73 and 75 through another port. Thus, the fluid flow path is essentially as shown in FIG. 2 except that there are compression and turbine stages in both directions of axial flow. The result is that additional stages of compression are introduced without increasing the engine length. Alternatively, the vanes in the return path can be on the same rotors which have vanes acted upon by fluid in the forward path. For the latter embodiment the two sets of vanes on the same rotor must be designed for fluid flows moving in opposite directions in each set of vanes.

As noted previously, engine 141 in FIG. 5 can include stators such as stator vane 155 between some or all of the rotors. In some instances it may be desirable to maintain a fixed speed ratio between various rotors. This can be accomplished by various well-known means. One implementation is shown in FIG. 5. Bevel gear 163, which rotates about axis 165, meshes with gear teeth on the periphery of rotors 143 and 145. For this implementation, rotors 143 and 145 rotate at the same speed but in opposite directions with respect to the engine housing. Mechanical power is extracted through shaft 165. Also, rotors 143 and 145 can be induced to rotate, as needed during starting, by externally rotating shaft 165.

It is common in prior axial flow turbines to progressively reduce the cross sectional flow area in the compressor portion of the engine, and to progressively increase the cross sectional flow area in the turbine stages of the engine. By controlling the flow areas, the pressures and flow velocities are controlled in an optimal manner. Variation of the cross sectional flow areas can also be incorporated in the present engines. Another means for controlling fluid pressures in the present and in conventional turbines is through the introduction of fuel and the combustion of this fuel progressively throughout the compression process. Thus, it is another aspect of this invention to control the compression pressures and velocities by varying cross sectional flow areas and/or by fuel combustion prior to the primary combustion point illustrated in the various embodiments shown. The distribution of these combustion processes will vary according to design needs. For instance, a fuel injector 181 and an igniter 183 can be provided in passageway 19 in engine 1 shown in FIG. 1, upstream of injector 25 and igniter 27, to effect such progressive combustion. Another aspect of the present invention is its use as a turbo supercharger. For this case (not illustrated) the hot gas entering the turbine section would be derived from the exhaust of another internal combustion engine. The compressed air leaving the compression stages of the present design would be directed to the air intake of the other internal combustion engine. Thus, when used as a turbo supercharger the system would be as shown in this invention except that the combustion chambers illustrated in FIGS. 1 through 5 would be replaced by an internal combustion engine. All other features, implementations, and advantages noted would remain.

The invention has been described in detail with particular emphasis on the preferred embodiments, but it should be understood that variations and modifications within the spirit and scope of the invention may occur to those skilled in the art to which the invention pertains.

I claim:

1. An axial flow turbine producing propulsion thrust comprising: an engine body;
   rotor means mounted in said engine body for free rotation about an axis, said rotor including a hub and a plurality of radially extending blades thereon, said blades having an inlet side and an outlet side and being movable along an annular path about said axis;

compression gas passages in said engine body defining a continuous combustion fluid compression path, said fluid compression path intersecting successively a plurality of different portions of said annular path, said intersecting paths defining a plurality of successive compression zones wherein fluid moving along fluid compression path repeatedly passes axially through said blades from said inlet side to said outlet side during revolution of said rotor means, said compression gas passages connecting the outlet side of one compression zone with the inlet side of the successive compression zone;

means for injecting fuel into said compression path following said compression zones;

a combustion chamber for receiving said compressed fluid and said fuel;

expansion gas passages in said engine body for directing combustion gases from said combustion chamber axially through a portion of said annular path of said blades from said inlet side to said outlet side to impart mechanical energy to said rotor means to effect rotation of said rotor means about said axis of rotation, said expansion gas passages further directing said combustion gases axially from said turbine to produce thrust.

2. The invention according to claim 1 wherein said rotor means comprises at least two co-axial rotors, said fluid compression path directs said fluid successively through said rotors for sequential stages of compression, and said expansion gas passages direct the compressed gases through the blades of at least one of said rotors.

3. The invention according to claim 2 wherein said two rotors are independently rotatable.

4. The invention according to claim 2 and further comprising synchronizing means for synchronizing the rates of rotation of said rotors.

5. The invention according to claim 1 and further comprising means for extracting mechanical power from said rotor means.

6. The invention according to claim 1 wherein said rotor means comprises at least one rotor having an annular ring with blades extending therefrom towards said axis of rotation, and said combustion chamber means is disposed within the hub of said one rotor.

7. The invention according to claim 1 wherein said rotor means comprises at least two rotors mounted for rotation about a common axis of rotation, one of said rotors including an annular ring with said blade extending radially inwardly towards said axis of rotation, and said combustion chamber means being disposed within said annular ring.

8. The invention according to claim 7 and further comprising speed control means for controlling the relative speeds of said rotors.

9. The invention according to claim 8 wherein said speed control means comprises gear means interconnecting said rotors.

10. The invention according to claim 1 wherein said combustion means comprises means for progressively introducing and igniting combustion fluid in said passages.

* * * * *